(12) United States Patent
Rodrigues

(10) Patent No.: US 12,056,920 B2
(45) Date of Patent: Aug. 6, 2024

(54) ROADMAP GENERATION SYSTEM AND METHOD OF USING

(71) Applicant: Woven by Toyota, Inc., Tokyo (JP)

(72) Inventor: José Felix Rodrigues, Tokyo (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 212 days.

(21) Appl. No.: 17/574,458

(22) Filed: Jan. 12, 2022

(65) Prior Publication Data
US 2023/0222788 A1  Jul. 13, 2023

(51) Int. Cl.
| | | |
|---|---|---|
| G06V 20/00 | (2022.01) | |
| G01C 21/00 | (2006.01) | |
| G06T 7/60 | (2017.01) | |
| G06V 10/26 | (2022.01) | |
| G06V 10/44 | (2022.01) | |
| G06V 10/80 | (2022.01) | |
| G06V 10/82 | (2022.01) | |
| G06V 20/10 | (2022.01) | |
| G06V 20/13 | (2022.01) | |

(52) U.S. Cl.
CPC ....... *G06V 20/182* (2022.01); *G01C 21/3852* (2020.08); *G06T 7/60* (2013.01); *G06V 10/267* (2022.01); *G06V 10/457* (2022.01); *G06V 10/80* (2022.01); *G06V 10/82* (2022.01); *G06V 20/13* (2022.01); *G06T 2207/10032* (2013.01); *G06T 2207/20044* (2013.01); *G06T 2207/30181* (2013.01); *G06T 2207/30242* (2013.01)

(58) Field of Classification Search
CPC .... G06V 20/182; G06V 10/457; G06V 10/82; G06V 10/267; G06V 10/80; G06V 20/13; G01C 21/3852; G06T 7/60; G06T 2207/10032; G06T 2207/20044; G06T 2207/30181; G06T 2207/30242
USPC ....................................................... 382/156
See application file for complete search history.

(56) References Cited

U.S. PATENT DOCUMENTS

| | | | |
|---|---|---|---|
| 2016/0098496 A1 | 4/2016 | Joshi et al. | |
| 2016/0102986 A1 | 4/2016 | Ma et al. | |
| 2017/0278398 A1* | 9/2017 | Kato | G08G 1/166 |
| 2019/0243372 A1* | 8/2019 | Huval | G05D 1/0214 |
| 2020/0386567 A1* | 12/2020 | Igarashi | G01C 21/3815 |

* cited by examiner

*Primary Examiner* — Michael R Neff
(74) *Attorney, Agent, or Firm* — HAUPTMAN HAM, LLP

(57) ABSTRACT

A method of determining a roadway map includes receiving an image from above a roadway. The method further includes generating a skeletonized map based on the received image, wherein the skeletonized map comprises a plurality of roads. The method includes identifying intersections based on joining of multiple roads of the plurality of roads in the skeletonized map. The method includes partitioning the skeletonized map based on the identified intersections, wherein partitioning the skeletonized map defines a roadway data set and an intersection data set. The method includes analyzing the roadway data set to determine a number of lanes in each roadway of the plurality of roads. The method further includes analyzing the intersection data set to lane connections in the identified intersections. The method further includes merging results of the analyzed road data set and the analyzed intersection data set to generate the roadway map.

18 Claims, 12 Drawing Sheets

ROADMAP GENERATION SYSTEM AND METHOD OF USING

BACKGROUND

Vehicle navigation, whether autonomous driving or navigation applications, use roadmaps in order to determine pathways for vehicles to travel. Navigation systems rely on the roadmaps to determine pathways for vehicles to move from a current location to a destination.

Roadmaps includes lanes along roadways as well as intersections between lanes. In some instances, roadways are indicated as single lines without information related to how many lanes are within the roadways or directionality of travel permitted along the roadways. Further, in some instances, intersections are indicated as a junction of two or more lines without information related to how vehicles are permitted to traverse the intersection.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
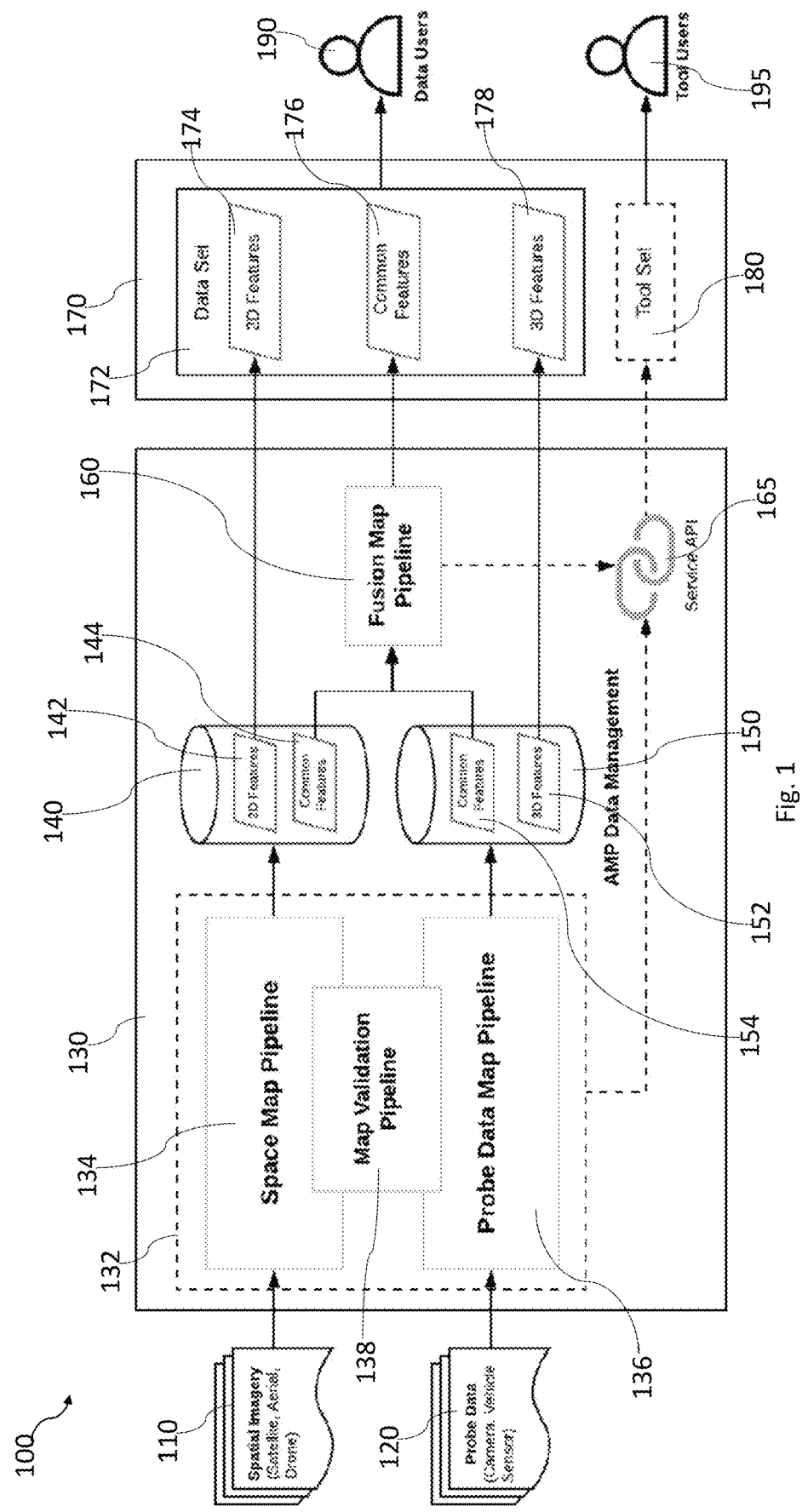
FIG. 1 is a diagram of a roadmap generation system in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

This description relates to generation of roadmaps. In some embodiments, information is extracted from satellite imagery and analyzed in order to determine road locations. Deep learning (DL) semantic segmentation is performed on received satellite imagery in order to classify each pixel in the satellite image based on an algorithm. The classified image is then subjected to pre-processing and noise removal. The noise removal includes mask cropping. The pre-processed image is then subjected to node detection in order to identify a "skeletonized" map. A skeletonized map is a map that includes road locations without information related to lanes, permitted travel directions, or other travel regulations associated with the road. The skeletonized map is subjected to processing and the result is usable to produce an accurate roadmap.

The skeletonized map is used to identify the location of intersections within the roadway. The intersections are identified based on a joining of multiple roads from the skeletonized map. A radius around the joining of the multiple roads is used to determine the location of the intersection. The intersections are then partitioned from the skeletonized map. The intersections and the remaining roads, i.e., non-intersections, are analyzed separately in order to develop an overall roadmap.

Analysis of the roads includes determining road width and number of lanes in the road. In some instances, the road analysis also determines whether the road is a one-way road, which permits travel only in a single direction, or a two-way road, which permits travel in two directions. In some embodiments, the determination of a one-way road is based on the lane width and/or a number of lanes. For example, if the road is determined to have a single lane, then the road is determined to be a one-way road, in some embodiments. In some embodiments, object detection is useable to determine whether the road is separated by a median or a double solid line, which would indicate a two-way road.

The determination of the road width is possible using object detection. Object detection is capable of detecting boundaries of the road, such as solid lines designating a boundary of the road. In some instances, object detection is used to determine the width of the road based on a change in appearance, such as color or reflectivity, in the received satellite image. For example, a transition from an asphalt road to a concrete sidewall or a grass shoulder of the road would be visible based on a change in color in the received satellite image. These transitions are then usable to determine the boundaries of the road.

Determination of a number of lanes in the road is possible using object detection and/or statistical analysis. In some embodiments, object detection is able to determine the number of lanes in the road by detecting dashed lines identifiable as lane lines. In some embodiments, statistical analysis is usable to determine the number of lanes by determining the overall road width and determining how many lanes are likely to be within that overall road width based on known lane width data.

A separate analysis is performed on the intersections within the defined radius. As the size of the radius increases, the accuracy of the intersection analysis increases; however, processing time and computing power also increases. As the size of the radius decreases, accuracy of the intersection analysis decreases, but the analysis is completed faster. In some embodiments, object detection is used in the analysis of the intersections in order to detect stop lines, e.g., solid lines on the road that extend perpendicular to the road, or crosswalks, e.g., dashed lines extending parallel to the road closely spaced in a direction perpendicular to the road. In some embodiments, a change from dashed lines, indicating lane lines, to solid lines, indicating a stop line, is used to analyze the intersection.

Following the separate analysis of the roads and intersections, the analyses are merged in order to produce a comprehensive map of a roadway system including both roads and intersections. In some embodiments, the comprehensive map is displayed using a pictorial representation. In some embodiments, the comprehensive map is displayed using numerical identification numbers for different portions of the roadway.

A confidence level of the comprehensive map is generated based on the type of analysis used to analyze the roads and the intersections. In some embodiments where object detection of lane lines are used in the analysis of the roads and intersections, a confidence level is high, e.g., predicted accuracy within 0.3 meters (m). In some embodiments where detection is based on color detected within the roads and intersection, a confidence level is at an intermediate level, e.g., a predicted accuracy between 0.3 m and 1.0 m. In some embodiments where the analysis is based on estimates related to road width detection, the confidence level is low, e.g., a predicted accuracy of about 1.0 m.

FIG. 1 is a diagram of a roadmap generation system 100 in accordance with some embodiments. The roadmap generation system 100 is configured to receive input information and generate roadmaps for use by data users 190, such as vehicle operators, and/or tool users 195, such as application (app) designers. The roadmap generator system 100 uses real world data, such as information captured from vehicles traveling the roadways and images from satellites or other overhead objects, in order to generate the roadmap. This helps to increase accuracy of the roadmap in comparison with some approaches that rely on historical data.

The roadmap generation system 100 is configured to receive spatial imagery 110 and probe data 120. The spatial imagery 110 includes images such as satellite images, aerial images, drone images or other similar images captured from above roadways. The probe data 120 includes vehicle sensor data, such as cameras, light detection and ranging (LiDAR) sensors, radio detection and ranging (RADAR) sensors, sonic navigation and ranging (SONAR) or other types of sensors.

The roadmap generation system 100 includes a processing unit 130 configured to generate pipelines and identify features based on the spatial imagery 110 and the probe data 120. The roadmap generation system 100 is configured to process the spatial imagery 110 and probe data 120 using a pipeline generation unit 132. The pipeline generation unit 132 is configured to determine roadway locations and paths based on the received information. A pipeline indicates locations of roadways. In some instances, a pipeline is also called a skeletonized roadmap. The pipeline generation unit 132 includes a space map pipe line unit 134 configured to process the spatial imagery 110. The pipeline generation unit 132 further includes a probe data map pipeline unit 136 configured to process the probe data 120. The space map pipeline unit 134 determines locations of roadways based on the spatial imagery 110, while the probe data map pipeline unit 136 determines locations of roadways based on the probe data 120 independent from the space map pipe line unit 134. By independently determining the locations of roadways, the pipeline generation unit 132 is able to confirm determinations performed by each of the sub-units, i.e., the space map pipeline unit 134 and the probe data map pipeline unit 136. This confirmation helps to improve precision and accuracy of the roadmap generation system 100 in comparison with other approaches. The pipeline generation unit 132 further includes a map validation pipeline unit 138 which is configured to compare the pipelines generated by the space map pipeline unit 134 and the probe data map pipeline unit 136. In response to a determination by the map validation pipeline unit 138 that a location of a roadway identified by both the space map pipeline unit 134 and the probe data map pipeline unit 136 is within a predetermined threshold variance, the map validation pipeline unit 138 confirms that the location of the roadway is correct. In some embodiments, the predetermined threshold variance is set by a user. In some embodiments, the predetermined threshold variance is determined based on resolution of the spatial imagery 110 and/or the probe data 120. In some embodiments, in response to a determination by the map validation pipeline unit 138 of a difference greater than the predetermine threshold variance between the space map pipeline unit 134 and the probe data map pipeline unit 136, such as failure to detect a roadway or a roadway location is different between the two units, the map validation pipeline unit 138 determines a pipeline developed based on more recently collected data of the spatial imagery 110 or probe data 120 to determine which pipeline to consider as accurate. That is, if the probe data 120 was collected more recently than the spatial imagery 110, the pipeline generated by the probe data map pipeline unit 136 is considered to be correct. In some embodiments, in response to a determination by the map validation pipeline unit 138 of a difference greater than the predetermine threshold variance between the space map pipeline unit 134 and the probe data map pipeline unit 136, such as failure to detect a roadway or a roadway location is different between the two units, the map validation pipeline unit 138 determines that neither pipeline is correct. In some embodiments, in response to a determination by the map validation pipeline unit 138 of a difference greater than the predetermine threshold variance between the space map pipeline unit 134 and the probe data map pipeline unit 136, such as failure to detect a roadway or a roadway location is different between the two units, the map validation pipeline unit 138 requests validation from the user. In some embodiments, the map validation pipeline unit 138 requests validation from the user by transmitting an alert, such as a wireless alert, to an external device, such as a user interface (UI) for a mobile device, usable by the user. In some embodiments, the alert includes an audio or visual alert configured to be automatically displayed to the user, e.g., using the UI for a mobile device. In response to an input received from the user, the map validation pipeline unit 138 determines that the user selected pipeline is correct.

The roadmap generation system 100 further includes a spatial imagery object detection unit 140 configured to detect objects and features of the spatial imagery 110 and the pipeline generated using the space map pipeline unit 134. The spatial imagery object detection unit 140 is configured to perform object detection on the pipeline and the spatial imagery 110 in order to identify features such as intersections, road boundaries, lane lines, buildings or other suitable features. In some embodiments, the features include two-dimensional (2D) features 142. The spatial imagery object detection unit 140 is configured to identify 2D features 142 because the spatial imagery 110 does not include ranging data, in some embodiments. In some embodiments, information is received from the map validation pipeline unit 138 in order to determine which features were identified based on both the spatial imagery 110 and the probe data 120. The features identified based on both the spatial imagery 110 and the probe data 120 are called common features 144 because these features are present in both sets of data. In some embodiments, the spatial imagery object detection unit 140 is configured to assign an identification number to each pipeline and feature identified based on the spatial imagery 110.

The roadmap generation system 100 further includes a probe data object detection unit 150 configured to detect objects and features of the probe data 120 and the pipeline generated using the probe data map pipeline unit 136. The probe data object detection unit 150 is configured to perform object detection on the pipeline and the probe data 120 in order to identify features such as intersections, road boundaries, lane lines, buildings or other suitable features. In some embodiments, the features include three-dimensional (3D) features 152. The probe data object detection unit 150 is configured to identify 3D features 152 because the probe data 120 includes ranging data, in some embodiments. In some embodiments, information is received from the map validation pipeline unit 138 in order to determine which features were identified based on both the spatial imagery 110 and the probe data 120. The features identified based on both the spatial imagery 110 and the probe data 120 are called common features 154 because these features are present in both sets of data. In some embodiments, the probe data object detection unit 150 is configured to assign an identification number to each pipeline and feature identified based on the probe data 120.

The roadmap generation system 100 further includes a fusion map pipeline unit 160 configured to combine the common features 144 and 154 along with pipelines from the pipeline generation unit 132. The fusion map pipeline unit 160 is configured to output a roadmap including both pipelines and common features.

The roadmap generation system 100 further includes a service application program interface (API) 165. The service API 165 is usable to permit the information generated by the pipeline generation unit 132 and the fusion map pipeline unit 160 to be output to external devices. The service API 165 is able to make the data agnostic to the programming language of the external device. This helps the data to be usable by a wider range of external devices in comparison with other approaches.

The roadmap generation system 100 further includes an external device 170. In some embodiments, the external device 170 includes a server configured to receive data from the processing unit 130. In some embodiments, the external device 170 includes a mobile device usable by the user. In some embodiments, the external device 170 include multiple devices, such as a server and a mobile device. The processing unit 130 is configured to transfer the data to the external device wirelessly or via a wired connection.

The external device 170 includes a memory unit 172. The memory unit 172 is configured to store information from the processing unit 130 to be accessible by the data users 190 and/or the tool users 195. In some embodiments, the memory unit 172 includes random access memory (RAM), such as dynamic RAM (DRAM), flash memory or another suitable memory. The memory unit 170 is configured to receive the 2D features 142 from the spatial imagery object detection unit 140. The 2D features are stored as a 2D feature parameter 174. The data set 172 is further configured to receive the common features from the fusion map pipeline unit 160. The common features are stored as a common features parameter 176. In some embodiments, the common features parameter 176 includes pipelines as well as common features. The memory unit 170 is configured to receive 3D features from the probe data object detection unit 150. The 3D features are stored as a 3D features parameter 178.

The external device 170 further includes a tool set 180 which includes data and data manipulation tools usable to generate apps which include or rely on information related to pipelines or identified features. In some embodiments, the tool set 180 is omitted. Omitting the tool set 180 reduces an amount of storage space and processing ability for the external device 170. However, omitting the tool set 180 reduces functionality of the external device 170 and the tool users 195 have a higher burden for generating apps. In some embodiments, the apps are capable of being installed in a vehicle. In some embodiments, the apps are related to autonomous driving or navigation systems.

In some embodiments, the data users 190 and the tool users 195 are the same. In some embodiments, the data users 190 use the data from the external device 170 to view roadmaps. In some embodiments, the data users 190 are able to provide feedback or comments related to the data in the external device 170.

Figure 2A:
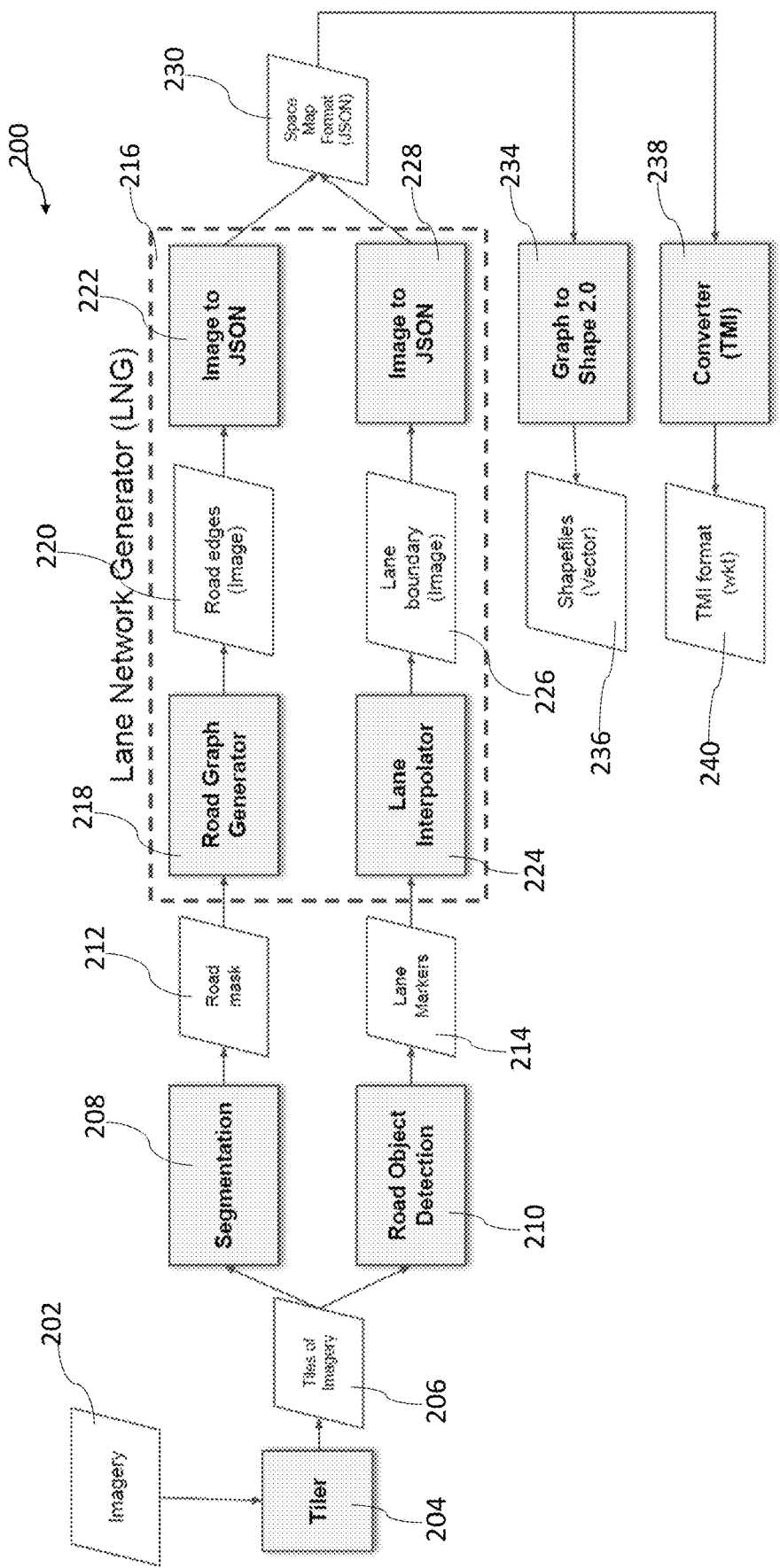
FIG. 2A is a flowchart of a method of generating a roadmap in accordance with some embodiments.

FIG. 2A is a flowchart of a method 200 of generating a roadmap in accordance with some embodiments. In some embodiments, the method 200 is implemented using the roadmap generation system 100 (FIG. 1). In some embodiments, the method 200 is implementing using a different system. The method 200 is configured to produce shapefiles usable for implementing navigation systems or autonomous driving systems. The method 200 is further configured to video data, e.g., in Thin Client Media (TMI) format, for use in in navigation systems or autonomous driving systems for indicating movement along roadways in a roadmap.

The method 200 includes operation 202 in which imagery is received. In some embodiments, the imagery includes satellite imagery, aerial imagery, drone imagery, or other suitable imagery. In some embodiments, the imagery includes spatial imagery 110 (FIG. 1). In some embodiments, the imagery is received from an external source. In some embodiments, the imagery is received wirelessly. In some embodiments, the imagery is received via a wired connection.

The method 200 further includes operation 204, in which the imagery is subjected to tiling by a tiler. In operation 204, the image is broken down into groups of pixels, called tiles.

In some embodiments, a size of each tile is determined by the user. In some embodiments, a size of each tile is determined based on a resolution of the received imagery. In some embodiments, a size of each tile is determined based on a size of the received imagery. In some embodiments, a size of a satellite image is about 1 gigabyte (GB). Tiling of the image helps to break the image down into usable pieces for further processing. As a size of each tile becomes smaller, later processing of the tiled imagery is more precise but has a higher processing load.

Figure 2D:
FIGS. 2B-2F are sample images generated during various operations of the method FIG. 2A in accordance with some embodiments.
Figure 2C:
Figure 2B:

The method 200 further includes operation 206, in which the tiles of the imagery are stored, e.g., in a memory unit. In some embodiments, the memory unit includes DRAM, flash memory, or another suitable memory. The tiles of the imagery are processed along two parallel processing tracks in order to develop a space map, which indicates features and locations of features in the received imagery. FIG. 2B is an example of a tiled image in accordance with some embodiments. In some embodiments, the image of FIG. 2B is generated by operation 206. The tiled image is sufficiently small to permit efficient processing of the information within the tiled image.

The method further includes operation 208, in which the tiled imagery is segmented. Segmenting of the tiled imagery includes partitioning the image based on identified boundaries. In some embodiments, the segmenting is performed by a deep learning (DL) segmentation process, which uses a trained neural network (NN) to identify boundaries within the tiled imagery. FIG. 2C is an example of an output of segmentation of a tiled image in accordance with some embodiments. In some embodiments, the image of FIG. 2C is generated by operation 208. The segmentations includes locations of roadways without including additional information such as lane lines or buildings.

The method further includes operation 210, in which objects on the road are detected. In some embodiments, the objects include lane lines, medians, cross-walks, stop lines or other suitable objects. In some embodiments, the object detection is performed using a trained NN. In some embodiments, the trained NN is a same trained NN as that used in operation 208. In some embodiments, the trained NN is different from the trained NN used in operation 210. FIG. 2D is an example of a tiled image including object detection information in accordance with some embodiments. In some embodiments, the image of FIG. 2D is generated by operation 210. The image including object detection information includes highlighting of objects, such as lane lines, and object identification information in the image.

The method further includes operation 212, in which a road mask is stored in the memory unit. The road mask is similar to the pipeline discussed with respect to the roadmap generation system 100 (FIG. 1). In some embodiments, the road mask is called a skeletonized road mask. The road mask indicates a location and path of roadways within the imagery.

The method further includes operation 214, in which lane markers are stored in the memory unit. While operation 214 refers to lane markers, one of ordinary skill in the art would recognize that other objects are also able to be stored in the memory unit based on the output of operation 210. For example, locations of cross-walks, stop lines or other suitable detected objects are also stored in the memory unit, in some embodiments.

The method further includes operation 216, in which a lane network is generated. The operation 216 includes multiple operations that are described below. The lane network includes positioning of lanes along roadways within the roadmap. The lane network is generated to have a description that is agnostic so a programming language of apps or systems that will use the generated lane network in order to implement a navigation system, an autonomous driving system or another suitable app.

The method further includes operation 218 in which a road graph is generated. The road graph includes not just roadway locations and paths, but also vectors for directions of travel along the roadways and boundaries for the roadways. In some embodiments, the boundaries for the roadways are determined using object recognition in order to determine boundaries for a roadways. Objects for determining boundaries of roadways include items such as sidewalks, solid lines near a periphery of the roadway, locations of buildings, or other suitable objects. In some embodiments, direction of travel along the roadways is determined based on orientation of vehicles on the roadway in the tiled imagery. For example, in some embodiments, a trained NN is usable to identify vehicles in the tiled imagery and a front of the vehicle is considered to be oriented in a direction of travel along the roadway.

The method further includes operation 220, in which an image of the road graph including road boundaries is stored in the memory unit. In some embodiments, the road boundaries include a line having a color different from a color indicating a presence of the roadway. In some embodiments, the image of the road graph further includes vectors indicating a direction of travel along the roadway.

The method further includes operation 222, in which the image of the road graph is converted into a textual representation. While FIG. 2A includes a JSON as an example of textual representation of the road graph image, one of ordinary skill in the art would recognize that other programming languages are usable with method 200. So long as the textual representation is agnostic or is able to be made agnostic for use in other apps, this description is not limited to any particular format for the textual representation.

The method further includes operation 224, in which lane interpolation is performed based on the stored lane markers. The lane interpolation extends the lane marking to portions of the roadway where lane markings were not detected in operation 210. For example, where a building or vehicle in the received imagery is blocking a lane marking, the lane interpolation will insert the lane markings into the expected location. In some embodiments, the lane interpolation is used to predict directions of travel through intersections of the roadways. In some embodiments, lane markings are not shown in the intersection, but metadata indicating an expected path of travel is embedded in the data generated by the lane interpolator.

The method further includes operation 226, in which an image of the lane boundaries including lane markers is stored in the memory unit. In some embodiments, the lane boundaries include a line having a color different from a color indicating a presence of the roadway.

The method further includes operation 228, in which the image of the lane boundaries is converted into a textual representation. While FIG. 2A includes a JSON as an example of textual representation of the lane boundary image, one of ordinary skill in the art would recognize that other programming languages are usable with method 200. So long as the textual representation is agnostic or is able to be made agnostic for use in other apps, this description is not limited to any particular format for the textual representation. In some embodiments, a format of the textual representation in operation 228 is a same format as in operation 222. In some embodiments, a format of the textual representation of operation 228 is different from the format in operation 222.

Figure 2F:
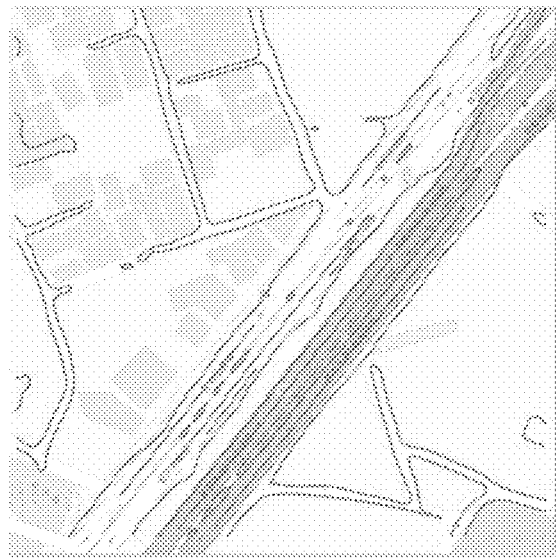
Figure 2E:
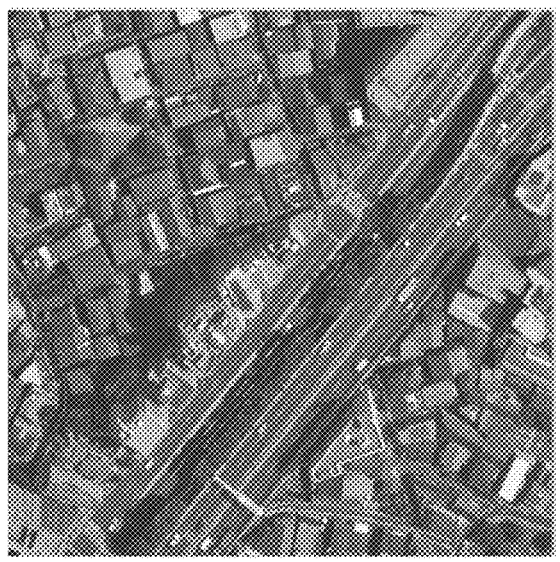

The method further includes operation 230 in which the textual representations generated in operation 222 and operation 228 are combined to define a space map. In some embodiments, where the format of the textual representations of the operation 222 and the operation 228 permits combining of the information without converting a format of the output of either of the operations. In some embodiments, at least one of the textual representation of the output of operation 222 or operation 228 is converted for inclusion in the space map. While FIG. 2A includes a JSON as an example of textual representation of the space map, one of ordinary skill in the art would recognize that other programming languages are usable with method 200. FIG. 2E is an example of a visual representation of a space map. In some embodiments, the textual representation generated in operation 230 is a textual representation of the information in FIG. 2E. The information in FIG. 2E includes lane boundaries, lane lines and other information related to the roadway network.

The method further includes operation 234 in which the space map is used to develop shapefiles. In some embodiments, the shapefiles are generated using a program, such as Shape 2.0™. A shapefile includes vector data, such as point, lines or polygons, related to travel along roadways. Each shapefile includes a single shape. The shapefiles are layered in order to determine vectors for traveling along a network of roadways. The shapefiles are usable in app such as navigation systems and autonomous driving for identifying directions of travel for vehicles. FIG. 2F is an example of a visual representation of layered shapefiles. In some embodiments, the shapefiles which are used to generate the layered shapefiles in FIG. 2F are generated in operation 234. The layered shapefiles include information related to permitted paths of travel in the roadway network.

The method further includes operation 236 in which the shapefiles are stored on the memory unit. In some embodiments, the shapefiles are stored as a layered group. In some embodiments, the shapefiles are stored as individual files. In some embodiments, the shapefiles are stored as separate files which are accessible by the user or the vehicle based on a determined position of the vehicle within the roadway network of the space map.

The method further includes operation 238 in which the space map is converted to an encoded video format in order to visually represent movement along a network of roadways in the space map. While FIG. 2A includes TMI as an example of the encoding of the space map, one of ordinary skill in the art would recognize that other programming languages are usable with method 200. Encoding a video based on the space map would allow, for example, a navigation system to display a simulated forward view for traveling along a roadway or a simulated bird's eye view for traveling along the roadway.

The method further includes operation 240 in which the encoded video is stored on the memory unit. In some embodiments, the encoded video is stored in multiple separate files that are accessible by a user or a vehicle based on a determined location of the vehicle within the roadway network of the space map.

Figure 3:
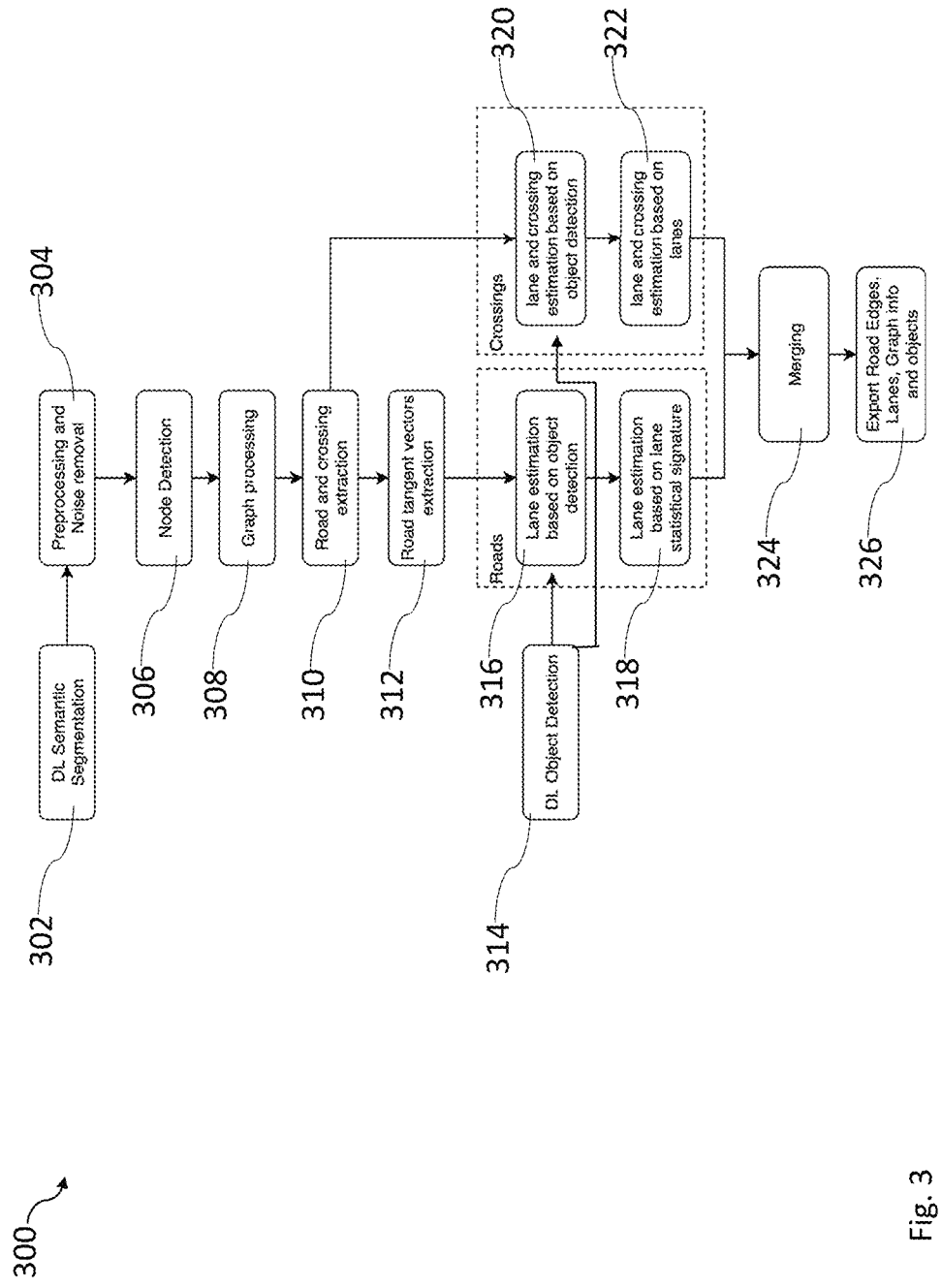
FIG. 3 is a flowchart of a method of generating a roadmap in accordance with some embodiments.

FIG. 3 is a flowchart of a method 300 of generating a roadmap in accordance with some embodiments. In some embodiments, the method 300 is usable to generate layered shapefiles, such as shapefiles stored in the memory unit in operation 236 of the method 200 (FIG. 2A). In some embodiments, the method 300 is implemented using the roadmap generation system 100 (FIG. 1). In some embodiments, the method 300 is implemented using a different system. The method 300 is configured to generate a roadmap by separately processing roads and intersections. By separately processing roads and intersections, the method 300 is able to increase the precision of generation by the roadmap in comparison with other approaches. By excluding information related to intersections during the evaluation of roads, the method 300 is able to remove high levels of variation within the analyzed data, which produces a roadmap with greater precision. Additionally, analyzing the intersections independently permits use of different evaluation tools and methodology in the intersections that is used in the roads. This allows more complex analysis of the intersections without significantly increasing the processing load for generating the roadmap by applying the same complex analysis to roads as well as intersections. As a result, time and power consumption of generating the roadmap is reduced in comparison with other approaches.

The method 300 includes operation 302 in which deep learning (DL) semantic segmentation. Semantic segmentation includes assigning a classification label to each pixel within a received image. In some embodiments, the DL semantic segmentation is implemented using a trained NN, such as a convoluted NN (CNN). By assigning classification labels to each of the pixels within the received image, roadways are able to be distinguished from other objects such as buildings, sidewalks, medians, rivers or other objects within the received image. This allows the generation of a skeletonized roadmap, which indicates the presence and location of roadways within the received image.

The method 300 further includes operation 304 in which preprocessing noise removal is performed on the segmented image. In some embodiments, the preprocessing includes downsampling of the segmented image. Downsampling includes reduction of image resolution, which helps reduce processing load for later processing of the image. In some embodiments, the noise removal includes filtering of the image, such as linear filtering, median filtering, adaptive filtering or other suitable filtering of the image. In some embodiments, the noise removal includes cropping of the skeletonized roadmap to remove portions of the image that do not include roadways. The preprocessing and noise removal helps to reduce processing load for the implementation of the method 300 and helps to increase precision of the generated roadmap by removing noise from the image.

The method 300 further includes operation 306, in which node detection is performed. Node detection includes identifying locations where roadways connect, e.g., intersections. In some embodiments, node detection further includes identifying significant features in a roadway other than crossing with another roadway, for example, a railroad crossing, a traffic light other than at an intersection, or another suitable feature.

The method 300 further includes operation 308 in which graph processing is performed. The graph processing is processing of the skeletonized roadmap based on the identified nodes in operation 306. The graph processing is able to generate a list of connected components. For example, in some embodiments, the graph processing identifies which roadways meet at a node of an identified intersection. The graph processing is also able to determine a distance along the roadway between nodes. In some embodiments, the graph processing further identifies changes in heading of the roadway between nodes. For example, in a situation where the roadway curves, the graph processing would be able to identify a distance from a first node that the roadway proceeds along a first heading or angle. Then, the graph processing would identify a change in heading and determine a distance that the roadway proceeds along the new, second, heading. In some embodiments, the graph processing is identifies a new heading each time a change in a heading of a roadway exceeds a heading threshold value. In some embodiments, a value of the heading threshold value is about 10-degrees. As the heading threshold value increases, a processing load for implementing the graph processing decreases, but accuracy in description of the roadway decreases. As the heading threshold value decreases, the processing load for implementing the graph processing increases, but accuracy in the description of the roadway increases.

The method 300 further includes operation 310 in which roads and crossings are identified and extracted for separate processing. The crossing or intersections are identified based on the nodes detected in operation 306. In some embodiments, a radius around the node is used to determine an extent of the intersection to be extracted. In some embodiments, the radius is constant for each intersection. In some embodiments, the radius for a first intersection is different from a radius for a second intersection. In some embodiments, the radius for each intersection is set based on a width of a roadway connected to the node. For example, a wider roadway connected to an intersection would be assumed to have a larger intersection. Applying a radius for the wider intersection that is a same size as a radius for a small intersection increases a risk that too much of the smaller intersection is extracted, which increases processing load, or less than an entirety of the larger intersection is extracted. In some embodiments, the radius for each intersection is set based on a number of roadways that meet at the node. For example, an intersection between two roadways would be expected to be smaller than an intersection between three or more roadways. Again, having a radius that is not consistent with an expected size of the intersection either increases processing load for implementing the method 300 or reduces accuracy and precision of the roadmap.

Following operation 310, the crossings or intersections are separated from the roadways other than the crossing or intersections for separate processing. The roadways are processed using operations 312-318, while the crossings are processed using operations 314, 320 and 322. By processing the crossings and roadways separately, the processing load for determining features of the roadways is reduced while accuracy and precision of the more complex crossings is maintained. This helps to produce an accurate and precise roadmap with lower processing load and time consumption in comparison with other approaches.

The method 300 further includes operation 312 in which road tangent vectors are extracted. Road tangent vectors indicate a direction of travel along a roadway to move from one node to another node. In some embodiments, the road tangent vectors include information related to a direction of travel. For example, for a one-way roadway that permits travel only in a single direction, the tangent vector indicates travel along the single direction.

The method 300 further includes operation 314 in which object detection is performed on the received image. The object detection is performed using deep learning, for example, using a trained NN. The operation 314 is performed on the image and the results of the object detection are used in both roadway processing and crossings processing. In some embodiments, the object detection includes classification of the detected object. For example, in some embodiments, a solid line parallel to the roadway is classified as a roadway boundary; a dashed line parallel to the roadway is classified as a lane line; a solid line perpendicular to the roadway is classified as a stop line; a series of shorter lines parallel to the roadway but spaced apart by less than a width of a lane is classified as a crosswalk; or other suitable classifications. In some embodiments, color is usable for object classification. For example, a white or yellow color is usable to identify markings on a roadways; a green color is usable to identify a median including grass or other vegetation; a lighter color, such as grey, is usable to identify a sidewalk or a concrete median.

The method 300 further includes operation 316 in which lane estimation is performed based on object detection received from an output of operation 314. Based on the objects detected in operation 314, a number of lanes along a roadway as well as whether the lane is expected to be a one-way road are determinable. Further, boundaries of the roadways are able to be determined based on detected objects. For example, in some embodiments, a detection of a single set of lane lines, e.g., dashed lines parallel to the roadway, the operation 316 determines that there are two lanes in the roadway. A solid line in a center area of a roadway indicates a dividing line for two-way traffic, in some embodiments. For example, detection of one or more solid lines in a central area of the roadway, or detection of a median, indicates that traffic along the roadway is expected to be in both directions with the solid line as a dividing line between the two directions of travel. In some embodiments, failure to detect a solid line in a central area of the roadway or detection of a median indicates a one-way road, in some embodiments.

The method 300 further includes operation 318 in which lane estimation is performed based on statistical analysis of the roadway. In some embodiments, the lane estimation is implementing by determining a width of the roadway and dividing that width by an average lane width in an area where the roadway is located. A largest integer of the resulting division suggests the number of lane within the roadway. In some embodiments, the method 300 retrieves information from an external data source, such as a server, to obtain information related to an average lane width in different areas. In some embodiments, object detection is combined with the statistical analysis in order to determine a number of lanes in a roadway. For example, in some embodiments, roadway boundaries are detected and instead of using an entire width of a roadway to determine a number of lanes only a distance between roadway boundaries is used to determine a number of lanes of the roadway. In some embodiments, a determination that a roadway includes a single lane is an indication that the roadway is a one-way road. In some embodiments, a determination of a single lane indicating a one-way road is limited to city or towns and the assumption is not applied to rural roadways.

In some embodiments, lane estimations from operation 316 are compared with lane estimations from operation 318 in order to verify the lane estimations. In some embodiments, lane estimations are verified if the lane estimations determined in operation 316 match the lane estimations determined in operation 318. In some embodiments, an alert is generated for a user in response to a discrepancy between the lane estimations determined in operation 316 and the lane estimations determined in operation 318. In some embodiments, the alert is automatically generated and transmitted to a user interface (UI) accessible by the user. In some embodiments, the alert includes an audio or visual alert. In some embodiments, lane estimations determined in operation 316 are usable to override lane estimations determined in operation 318 in response to a conflict between the two lane estimations. For this description, a discrepancy is a situation where one lane estimation includes the presence of a lane or a position of a lane and there was no determination of a lane using the other lane estimation; and a conflict is where a first lane estimation determines a different location or a positive determination of an absence of a lane from a second lane determination.

In some embodiments, features identified in operation 316 are given a high confidence level, indicating that the location of the feature is highly precise. In some embodiments, features having a high confidence level have a location accuracy within 0.3 meters of the calculated location. In some embodiments, features identified in operation 318 have a low confidence level, indicating that the location of the feature is less precise than those identified in operation 316. In some embodiments, features having a low confidence level have a location accuracy within 1.0 meters. In some embodiments, a feature identified in operation 316 that has a discrepancy with a feature identified in operation 318 has a medium confidence level, which is between the high confidence level and the low confidence level. In some embodiments, the confidence level is stored as metadata in association with the corresponding feature. In some embodiments, the confidence level is included with the output of the features in operation 326 described below.

In some embodiments, operations 316 and 318 are usable to interpolate location of features on the roadway that are obscured by objects within the received image, such as buildings. In some embodiments, the operations 316 and 318 use available data related to the roadway from the received image in order to predict locations of corresponding obscured features.

Operations 316 and 318 are formed on portions of the roadways outside of the radius established in operation 310. In contrast, operations 320 and 322 are performed on portions of roadways inside the radius established in operation 310.

The method 300 further includes operation 320 in which lane and crossing estimations are performed based on the objection detection of operation 314. In some instances, crossings are also called intersections. Based on the objects detected in operation 314, lane connections through an intersection are able to be determined. For example, in some embodiments, dashed lines following a curve through the intersection are usable to determine a connection between lanes in some embodiments. In some embodiments, lane position relative to a side of the roadway is usable to determine lane connections through the intersection. For example, a lane closest to a right-hand side of the roadway on a first side of the roadway is assumed to connect to a lane closest to the right-hand side of the roadway on a second side of the intersection across the intersection from the first side. In some embodiments, detected medians within the radius set in operation 310 are usable to determine lane connections through the intersection. For example, a lane on the first side of the intersection that is a first distance from the right-hand side of the roadway is determined to be a turn only lane in response to a median being the first distance from the right-hand side of the roadway on the second side of the intersection. Thus, the lane on the first side of the intersection is not expected to directly connect with a lane on the second side of the intersection.

In some embodiments, object recognition identifies road markings, such as arrows, on the roadway that indicate lane connections through the intersection. For example, a detected arrow indicating straight only indicates that the lane on the first side of the intersection would be connected to a lane on the second side of the intersection directly across the intersection, in some embodiments. In some embodiments, a detected arrow indicating a turn only lane indicates that the lane on the first side of the intersection is not connected to a lane on the second side of the intersection. In some embodiments, a detected stop line is usable to determine how many lanes for a certain direction of travel are present at the intersection. For example, in response to detecting of a stop line that extend across an entirety of the roadway, the roadway is determined to be a one-way road, in some embodiments. In some embodiments, in response to detecting a stop line that extends partially across the roadway for a distance of approximately two lane widths indicates two lanes are present which permit travel in a direction approaching the intersection along the roadway; and since the stop line does not extend across an entirety of the roadway, the roadway permits two-way traffic.

In some embodiments, detecting of vehicles traveling through the intersection across multiple images is usable to determine connections between lanes at the intersection. For example, detection of a series of vehicles travelling from a first lane on the first side of the intersection to a second lane on the second side of the intersection, the operation 320 would determine that the first and second lanes are connected, in some embodiments. In some embodiments, a detection of a series of vehicles travelling from a first lane on the first side of the intersection to a third lane to the left of the first side would indicate that the first lane allows turning left to enter the third lane. In some embodiments, connections between the lanes based on detected vehicle paths are assumed following detection of a threshold number of vehicles traveling along a particular path within a specific time frame. Setting a threshold number of vehicles traveling along the path within a certain time frame helps to avoid establishing a lane connection between lanes based on illegal or emergency path traveled by a single vehicle or by very few vehicles over a long period of time. In some embodiments, the threshold number of vehicles ranges from about five (5) vehicles within one hour to about ten (10) vehicles within twenty (20) minutes. As a number of vehicles within the threshold increases or the time period decreases, a risk of being unable to establish lane connections increases because frequency of the vehicles traveling along the path have a higher risk of not satisfying the threshold. As a number of vehicles within the threshold decreases or the time period increases, a risk of establishing erroneous lane connections increases.

The method 300 further includes operation 322 in which lane connections across the crossing are determined based on identified lanes. In some embodiments, a presence of lanes within the radius determined in operation 310 is based on object detection or statistical analysis as discussed above in operations 316 and 318. In some embodiments, information from at least one of the operation 316 or the operation 318 is usable in operation 322 to determine a location of lanes proximate the radius determined in operation 310. Operation 322 determines connections between lanes through the intersection based on relative positions of the lanes. That is, each lane is considered to have a connection with a corresponding lane on an opposite side of the intersection.

In some embodiments, lane connections from operation 320 are compared with lane connections from operation 322 in order to verify the lane connections. In some embodiments, lane connections are verified if the lane connections determined in operation 320 match the lane connections determined in operation 322. In some embodiments, an alert is generated for a user in response to a discrepancy between the lane connections determined in operation 320 and the lane connections determined in operation 322. In some embodiments, the alert is automatically generated and transmitted to a user interface (UI) accessible by the user. In some embodiments, the alert includes an audio or visual alert. In some embodiments, lane connections determined in operation 320 are usable to override lane connections determined in operation 322 in response to a conflict between the two lane connections. For this description, a discrepancy is a situation where one lane connection includes the presence of connection and there was no determination of a lane connection using the other lane connection operation; and a conflict is where a first lane connections determines a different location or a positive determination of an absence of a lane connection from a second lane connection.

The method 300 further includes an operation 324 where the analysis of the roadways in operations 312-318 are combined with the analysis of the intersections in operations 314, 320 and 322. In some embodiments, the two analyses are combined by aligning lanes at the radii determined in operation 310. In some embodiments, the two analyses are combined by layering shapefiles generated by each analysis together.

The method 300 further includes an operation 326 in which the merged analyses are exported. In some embodiments, the merged analyses are transmitted to an external device, such as a server or a UI. In some embodiments, the merged analyses are transmitted wirelessly or by a wired connection. In some embodiments, the merged analyses are usable in a navigation system for instructing a vehicle operator which path to travel along the roadway network in order to reach a destination. In some embodiments, the merged analyses are usable in an autonomous driving protocol for instructing a vehicle to automatically travel along the roadway network to reach a destination.

In some embodiments, the method 300 includes additional operations. For example, in some embodiments, the method 300 includes receiving historical information related to the roadway network. The historical information permits comparison between newly received information and the historical information to improve efficiency in analysis of the newly received information. In some embodiments, an order of operations of the method 300 is altered. For example, in some embodiments, operation 312 is performed prior to operation 310. In some embodiments, at least operation from the method 300 is omitted. For example, in some embodiments, the operation 326 is omitted and the merged analyses are stored on a memory unit for access by a user.

Figure 4B:
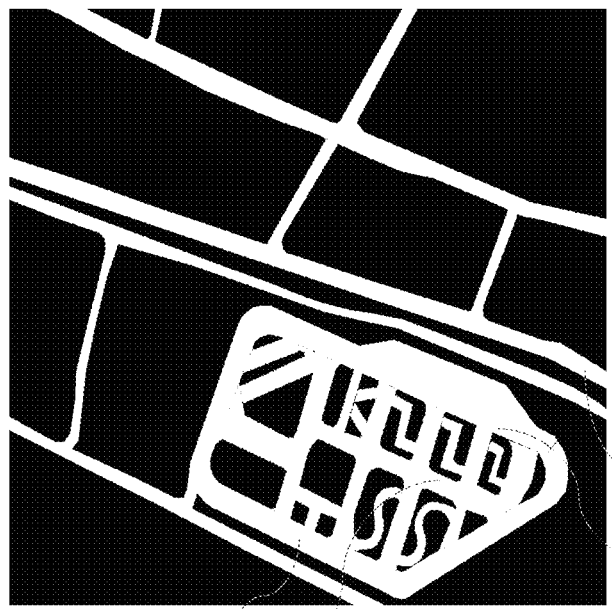
FIG. 4B is a plan view of roadways in accordance with some embodiments.
Figure 4A:
FIG. 4A is a bird's eye image in accordance with some embodiments.

FIG. 4A is a bird's eye image 400A in accordance with some embodiments. In some embodiments, the image 400A is a tiled image received by the method 300 (FIG. 3) for undergoing DL semantic segmentation. In some embodiments, the image 400A is part of an imagery received in operation 202 of method 200 (FIG. 2A). In some embodiments, the image 400A is part of spatial imagery 110 received by system 100 (FIG. 1). The image 400A includes roadways 410A. Some of the roadways 410A are connected together. Some of the roadways 410 are separated from one another, e.g., by buildings or medians.

FIG. 4B is a plan view 400B of roadways in accordance with some embodiments. In some embodiments, the view 400B is a result of DL semantic segmentation in operation 302 of the method 300 (FIG. 3). In some embodiments, the view 400B is a result of the segmentation in operation 208 of the method 200 (FIG. 2A). In some embodiments, the view 400B is generated in space map pipeline unit 134 in the system 100 (FIG. 1). The view 40B includes roadways 410B. A location and size of the roadways 410B correspond to the location and size of the roadways 410A in the image 400A (FIG. 4A). The buildings, medians, vehicles and other objects in the image 400A (FIG. 4A) are removed by the segmentation process to produce a skeletonized roadmap.

Figure 5B:
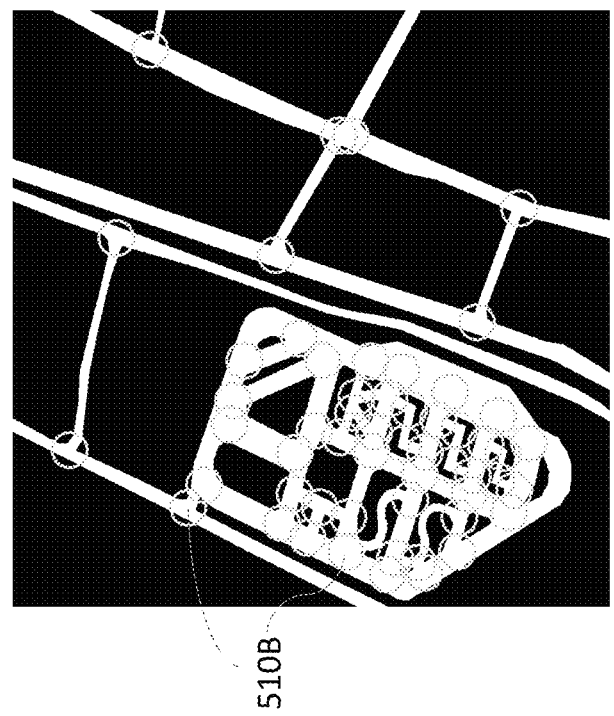
FIG. 5B is a plan view of roadways including enlarged intersection regions in accordance with some embodiments.
Figure 5A:
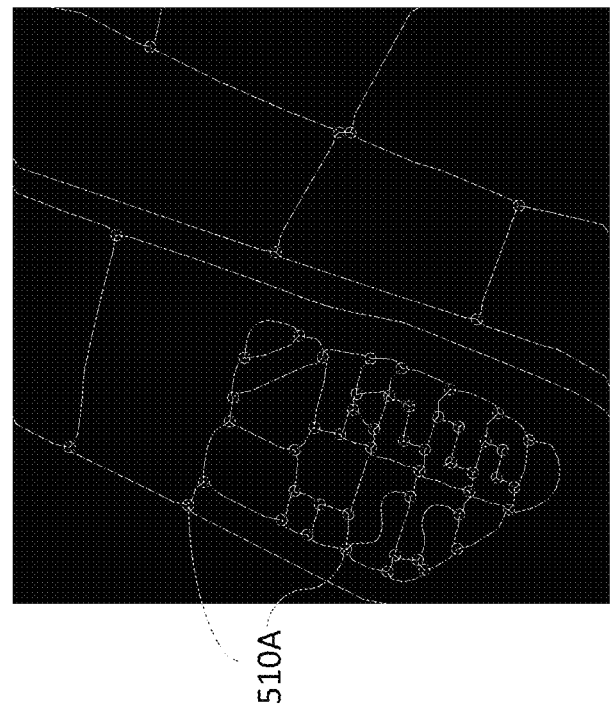
FIG. 5A is a plan view of roadways including intersection identification in accordance with some embodiments.

FIG. 5A is a plan view 500A of roadways including intersection identification in accordance with some embodiments. In some embodiments, the view 500A is a result of node detection in operation 306 of the method 300 (FIG. 3). In some embodiments, the view 500A is a result of detection of intersections by road object detection in operation 210 of the method 200 (FIG. 2A). In some embodiments, the view 500A is generated in fusion map pipeline unit 160 in the system 100 (FIG. 1). The view 500A includes nodes 510A at intersections of the roadways from a skeletonized roadmap.

FIG. 5B is a plan view 500B of roadways including enlarged intersection regions in accordance with some embodiments. The view 500B is similar to the view 500A (FIG. 5A) with radii 510B around each of the identified intersections. The radii 510B extend beyond the boundary of each of the intersections in the view 500B. Each of the radii 510B in the view 500B have a same size. In some embodiments, at least one of the radii 510B has a different size from at least one other radii 510B. In some embodiments, the radii 510B are generated based on operation 310 in the method 300 (FIG. 3).

Figure 6:
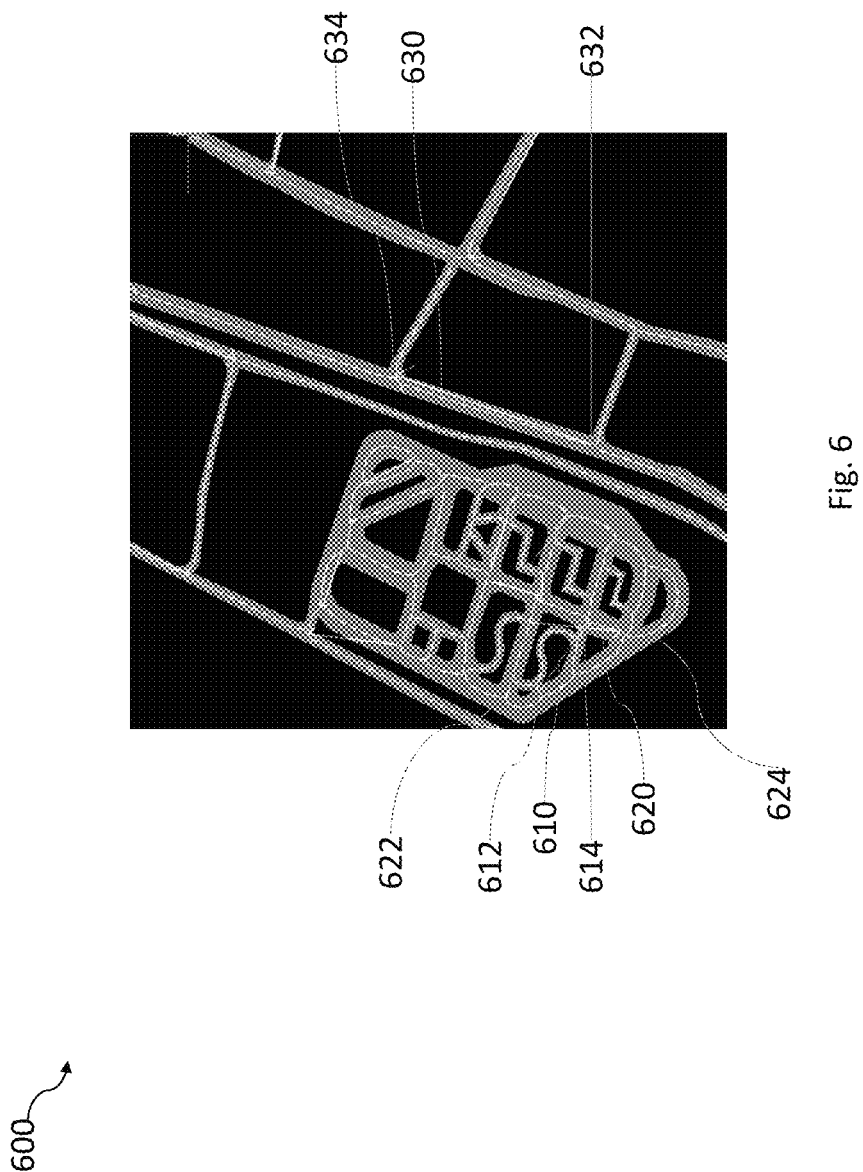
FIG. 6 is a plan view of roadways including vectors in accordance with some embodiments.

FIG. 6 is a plan view 600 of roadways including vectors 610, 620 and 630 in accordance with some embodiments. The view 600 includes a skeletonized roadmap similar to the view 400B (FIG. 4B). In comparison with the view 400B (FIG. 4B), the view 600 includes vectors 610, 620 and 630 indicating a direction of travel from one intersection, i.e., node, to another intersection. The vector 610 indicates a direction of travel from intersection 612 to intersection 614. The vector 620 indicates a direction of travel from intersection 622 to intersection 624. The vector 630 indicates a direction of travel from intersection 632 to intersection 634. The vectors 610, 620 and 630 are usable in order to determine what movement a vehicle would take to travel from one intersection to another intersection. This helps with determining which roadways and lane connections a vehicle should take in order to travel from the first intersection to the second intersection. In some embodiments, the view 600 is a result of operation 312 in the method 300 (FIG. 3).

Figure 7:
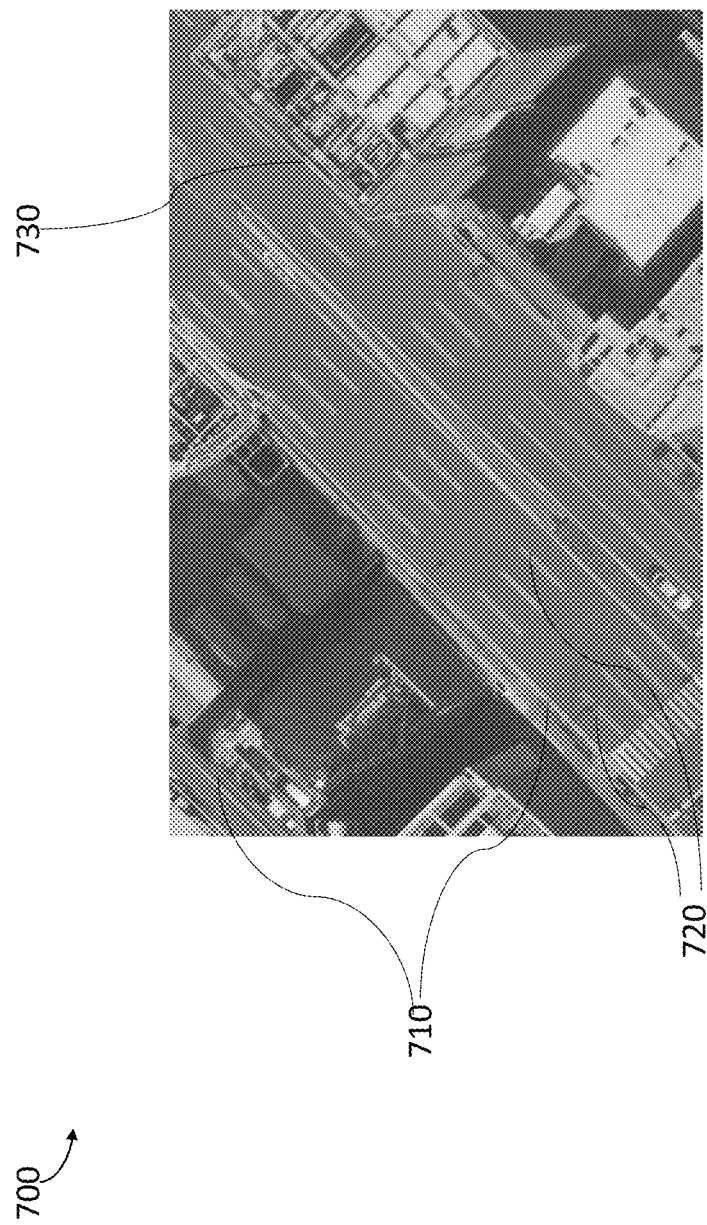
FIG. 7 is a bird's eye image of a roadway including identified markers in accordance with some embodiments.

FIG. 7 is a bird's eye image 700 of a roadway including identified markers 710, 720 and 730 in accordance with some embodiments. In some embodiments, the image 700 is a result of operation 314 in the method 300 (FIG. 3). In some embodiments, the image 700 is a visual representation of a space map in operation 230 in the method 200 (FIG. 2A). In some embodiments, the image 700 is produced by the spatial imagery object detection unit 140 in the roadmap generation system 100 (FIG. 1). The image 700 includes a roadway. Roadway boundary markers 710 indicate borders of the roadway. Lane line markers 720 indicate lane lines along the roadway. A marker 730 indicates an edge of a building which obstructs a view of the roadway. As a result of the obstruction by the buildings as indicated by marker 730, obscured information for the roadway is interpolated from data available in the image 700.

Figure 8C:
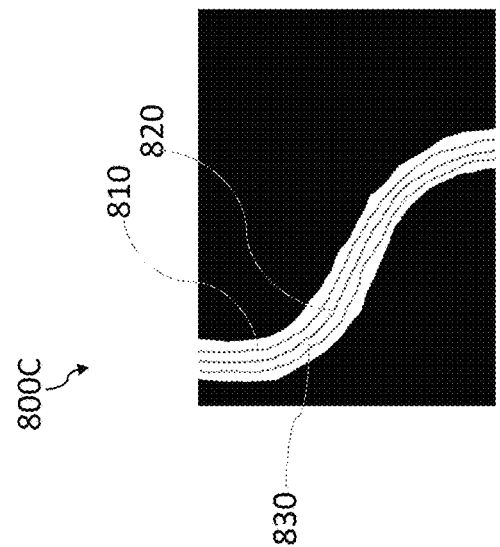
FIGS. 8A-8C are plan views of a roadway at various stages of lane identification in accordance with some embodiments.
Figure 8B:
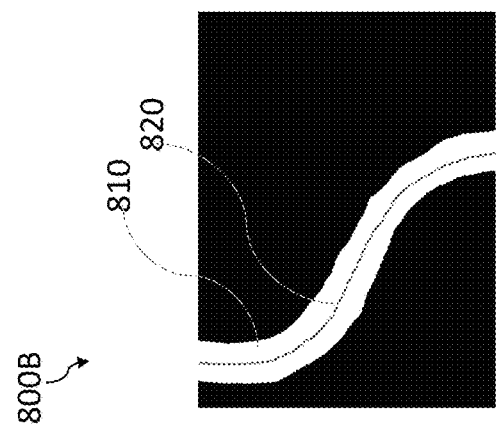
Figure 8A:
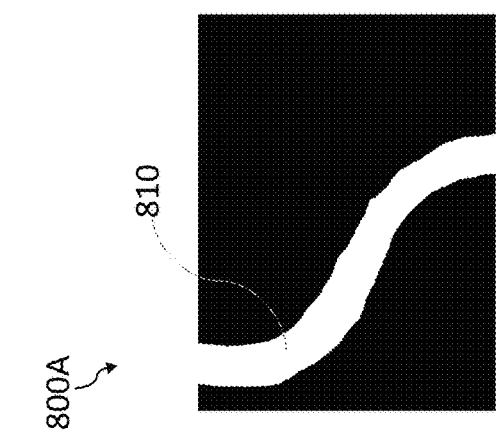

FIGS. 8A-8C are plan views of a roadway at various stages of lane identification in accordance with some embodiments. In some embodiments, FIGS. 8A-8C include views generated using operations 316 and/or 318 of the method 300 (FIG. 3). In some embodiments, FIGS. 8A-8C include views generated by the operation 216 of the method 200 (FIG. 2A). In some embodiments, FIGS. 8A-8C include views generated by the spatial imagery object detection unit 140 in the roadmap generation system 100 (FIG. 1). FIG. 8A includes a view 800A include a skeletonized road 810. FIG. 8B includes a view 800B including road 810 and a lane marker 820 along a central region of the road 810. In some embodiments, the lane marker 820 indicates a solid line separating traffic moving in opposite directions. In some embodiments, the lane marker 820 indicates a dashed line between lanes separating traffic moving in a same direction. FIG. 8C includes a view 800C including the road 810, the lane marker 820 and roadway boundary markers 830. The roadway boundary markers 830 indicate the periphery of the road 810. In some embodiments, areas beyond the roadway boundary markers 830 include a shoulder of the roadway, a sidewalk, a parking area along the roadway or other roadway features.

Figure 9C:
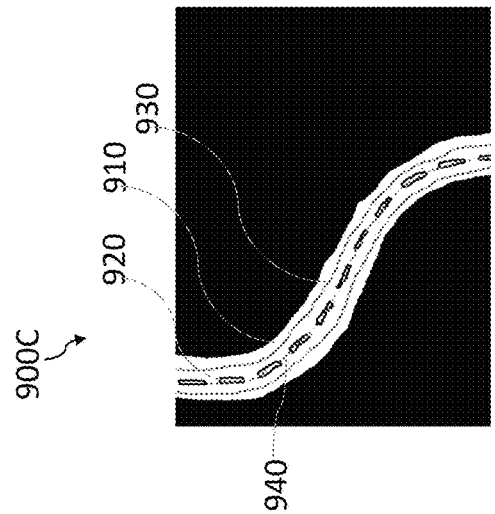
FIGS. 9A-9C are plan views of a roadway at various stages of lane identification in accordance with some embodiments.
Figure 9B:
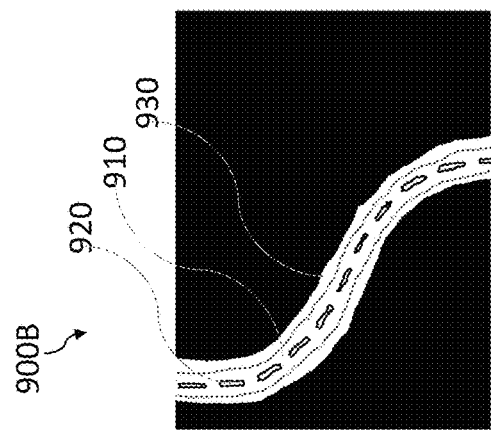
Figure 9A:
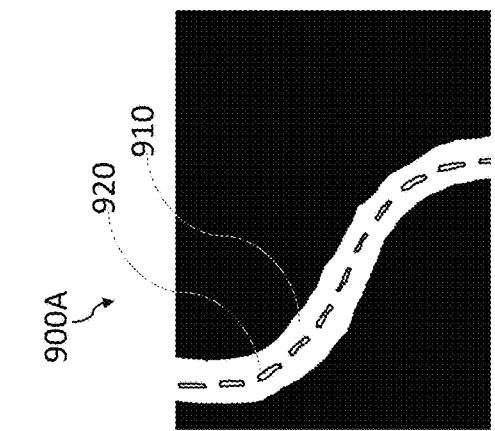

FIGS. 9A-9C are plan views of a roadway at various stages of lane identification in accordance with some embodiments. In some embodiments, FIGS. 9A-9C include views generated using operations 316 and/or 318 of the method 300 (FIG. 3). In some embodiments, FIGS. 9A-9C include views generated by the operation 216 of the method 200 (FIG. 2A). In some embodiments, FIGS. 9A-9C include views generated by the spatial imagery object detection unit 140 in the roadmap generation system 100 (FIG. 1). FIG. 9A includes a view 900A include a skeletonized road 910 and a lane line marker 920. In contrast with view 800B (FIG. 8B), the lane line marker 920 clearly indicates a dashed line separating traffic moving in a same direction. FIG. 9B includes a view 900B including road 910, lane line marker 920 and roadway boundaries 930. The roadway boundary markers 930 indicate the periphery of the road 910. In some embodiments, areas beyond the roadway boundary markers 930 include a shoulder of the roadway, a sidewalk, a parking area along the roadway or other roadway features. FIG. 9C includes a view 900C including a roadway graph 940 indicating a path of the road 910. In some embodiments, the roadway graph 940 is generated using operation 308 of the method 300 (FIG. 3).

Figure 10:
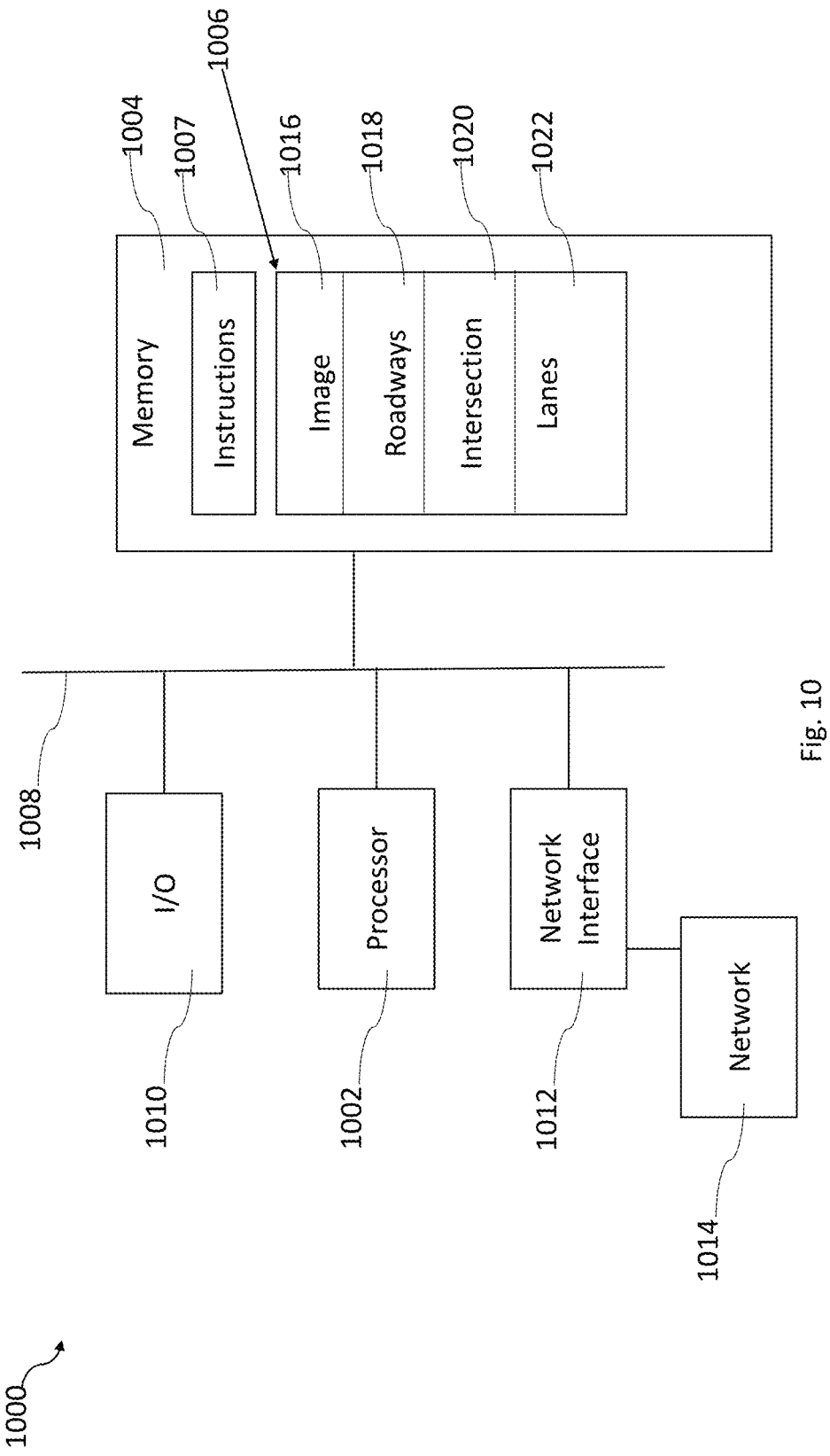
FIG. 10 is a diagram of a system for generating a roadmap in accordance with some embodiments.

FIG. 10 is a diagram of a system 1000 for generating a roadmap in accordance with some embodiments. System 1000 includes a hardware processor 1002 and a non-transitory, computer readable storage medium 1004 encoded with, i.e., storing, the computer program code 1006, i.e., a set of executable instructions. Computer readable storage medium 1004 is also encoded with instructions 1007 for interfacing with external devices, such as a server or UI. The processor 1002 is electrically coupled to the computer readable storage medium 1004 via a bus 1008. The processor 1002 is also electrically coupled to an I/O interface 1010 by bus 1008. A network interface 1012 is also electrically connected to the processor 1002 via bus 1008. Network interface 1012 is connected to a network 1014, so that processor 1002 and computer readable storage medium 1004 are capable of connecting to external elements via network 1014. The processor 1002 is configured to execute the computer program code 1006 encoded in the computer readable storage medium 1004 in order to cause system 1000 to be usable for performing a portion or all of the operations as described in roadmap generation system 100 (FIG. 1), the method 200 (FIG. 2A) or the method 300 (FIG. 3).

In some embodiments, the processor 1002 is a central processing unit (CPU), a multi-processor, a distributed processing system, an application specific integrated circuit (ASIC), and/or a suitable processing unit.

In some embodiments, the computer readable storage medium 1004 is an electronic, magnetic, optical, electromagnetic, infrared, and/or a semiconductor system (or apparatus or device). For example, the computer readable storage medium 1004 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1004 includes a compact disk-read only memory (CD-ROM), a compact disk-read/write (CD-R/W), and/or a digital video disc (DVD).

In some embodiments, the storage medium 1004 stores the computer program code 1006 configured to cause system 100 to perform a portion or all of the operations as described in roadmap generation system 100 (FIG. 1), the method 200 (FIG. 2A) or the method 300 (FIG. 3). In some embodiments, the storage medium 1004 also stores information needed for performing a portion or all of the operations as described in roadmap generation system 100 (FIG. 1), the method 200 (FIG. 2A) or the method 300 (FIG. 3) as well as information generated during performing a portion or all of the operations as described in roadmap generation system 100 (FIG. 1), the method 200 (FIG. 2A) or the method 300 (FIG. 3), such as an image parameter 1016, a roadways parameter 1018, an intersection parameter 1020, a lanes parameter 1022, and/or a set of executable instructions to perform a portion or all of the operations as described in roadmap generation system 100 (FIG. 1), the method 200 (FIG. 2A) or the method 300 (FIG. 3).

In some embodiments, the storage medium 1004 stores instructions 1007 for interfacing with external devices. The instructions 1007 enable processor 1002 to generate instructions readable by the external devices to effectively implement a portion or all of the operations as described in roadmap generation system 100 (FIG. 1), the method 200 (FIG. 2A) or the method 300 (FIG. 3).

System 1000 includes I/O interface 1010. I/O interface 1010 is coupled to external circuitry. In some embodiments, I/O interface 1010 includes a keyboard, keypad, mouse, trackball, trackpad, and/or cursor direction keys for communicating information and commands to processor 1002.

System 1000 also includes network interface 1012 coupled to the processor 1002. Network interface 1012 allows system 1000 to communicate with network 1014, to which one or more other computer systems are connected. Network interface 1012 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in roadmap generation system 100 (FIG. 1), the method 200 (FIG. 2A) or the method 300 (FIG. 3) is implemented in two or more systems 100, and information is exchanged between different systems 1000 via network 1014.

An aspect of this description relates to a method of determining a roadway map. The method includes receiving an image from above a roadway. The method further includes generating a skeletonized map based on the received image, wherein the skeletonized map comprises a plurality of roads. The method further includes identifying intersections based on joining of multiple roads of the plurality of roads in the skeletonized map. The method further includes partitioning the skeletonized map based on the identified intersections, wherein partitioning the skeletonized map defines a roadway data set and an intersection data set. The method further includes analyzing the roadway data set to determine a number of lanes in each roadway of the plurality of roads. The method further includes analyzing the intersection data set to lane connections in the identified intersections. The method further includes merging results of the analyzed road data set and the analyzed intersection data set to generate the roadway map. In some embodiments, the received image is a satellite image. In some embodiments, analyzing the roadway data set includes analyzing the roadway data set using a trained neural network to perform object detection. In some embodiments, performing object detection includes identifying lane lines along at least one road of the plurality of roads. In some embodiments, analyzing the roadway data set includes determining a width of a road of the plurality of roads. In some embodiments, the method further includes determining a number of lanes on the road based on the determined width of the road. In some embodiments, partitioning the skeletonized map includes setting a node at each of the identified intersections; setting a radius around the node; and defining the roadway data set as being outside of the radius around the node. In some embodiments, setting the radius includes setting the radius around the node to be a same value for each of the identified intersections. In some embodiments, setting the radius includes setting the radius around a node associated with a first identified intersection of the identified intersections to be different from the radius around a node associated with a second identified intersection of the identified intersections.

An aspect of this description relates to a system. The system includes a non-transitory computer readable medium configured to store instructions thereon. The system further includes a processor connected to the non-transitory computer readable medium. The processor is configured to execute the instructions for receiving an image from above a roadway. The processor is further configured to execute the instructions for generating a skeletonized map based on the received image, wherein the skeletonized map comprises a plurality of roads. The processor is further configured to execute the instructions for identifying intersections based on joining of multiple roads of the plurality of roads in the skeletonized map. The processor is further configured to execute the instructions for partitioning the skeletonized map based on the identified intersections, wherein partitioning the skeletonized map defines a roadway data set and an intersection data set. The processor is further configured to execute the instructions for analyzing the roadway data set to determine a number of lanes in each roadway of the plurality of roads. The processor is further configured to execute the instructions for analyzing the intersection data set to lane connections in the identified intersections. The processor is further configured to execute the instructions for merging results of the analyzed road data set and the analyzed intersection data set to generate a roadway map. In some embodiments, the received image is a satellite image. In some embodiments, the processor is configured to execute the instructions for analyzing the roadway data set using a trained neural network to perform object detection. In some embodiments, the processor is configured to execute the instructions for using the object detection to identify lane lines along at least one road of the plurality of roads. In some embodiments, the processor is configured to execute the instructions for determining a width of a road of the plurality of roads. In some embodiments, the processor is configured to execute the instructions for determining a number of lanes on the road based on the determined width of the road. In some embodiments, the processor is configured to execute the instructions for partitioning the skeletonized map by setting a node at each of the identified intersections; setting a radius around the node; and defining the roadway data set as being outside of the radius around the node. In some embodiments, the processor is configured to execute the instructions for setting the radius around the node to be a same value for each of the identified intersections. In some embodiments, the processor is configured to execute the instructions for setting the radius around a node associated with a first identified intersection of the identified intersections to be different from the radius around a node associated with a second identified intersection of the identified intersections.

An aspect of this description relates to a method of determining a roadway map. The method includes receiving an image from above a roadway. The method further includes generating a skeletonized map based on the received image, wherein the skeletonized map comprises a plurality of roads. The method further includes identifying nodes based on joining of multiple roads of the plurality of roads in the skeletonized map. The method further includes setting a plurality of radii, wherein each of the plurality of radii is around a corresponding node of the identified nodes. The method further includes partitioning the skeletonized map to define a roadway data set outside each of the plurality of radii and an intersection data set within each of the plurality of radii. The method further includes analyzing the roadway data set to determine a number of lanes in each roadway of the plurality of roads. The method further includes analyzing the intersection data set to lane connections. The method further includes merging results of the analyzed road data set and the analyzed intersection data set to generate the roadway map. In some embodiments, the method further includes wirelessly transmitting the merged results to an external device.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of determining a roadway map, the method comprising:
   receiving an image from above a roadway;
   generating a skeletonized map based on the received image, wherein the skeletonized map comprises a plurality of roads;
   identifying intersections based on joining of multiple roads of the plurality of roads in the skeletonized map;
   partitioning the skeletonized map based on the identified intersections, wherein partitioning the skeletonized map defines a roadway data set and an intersection data set;
   analyzing the roadway data set to determine a number of lanes in each roadway of the plurality of roads;

analyzing the intersection data set to determine lane connections extending directly across respective intersections in the identified intersections; and merging results of the analyzed road data set and the analyzed intersection data set to generate the roadway map, wherein partitioning the skeletonized map comprises:

setting a node at each of the identified intersections;
setting a radius around the node; and
defining the roadway data set as being outside of the radius around the node.

2. The method according to claim 1, wherein the received image is a satellite image.

3. The method according to claim 1, wherein analyzing the roadway data set includes analyzing the roadway data set using a trained neural network to perform object detection.

4. The method according to claim 3, wherein performing object detection comprises identifying lane lines along at least one road of the plurality of roads.

5. The method according to claim 1, wherein analyzing the roadway data set comprises determining a width of a road of the plurality of roads.

6. The method according to claim 5, further comprising determining a number of lanes on the road based on the determined width of the road.

7. The method according to claim 1, wherein setting the radius comprises setting the radius around the node to be a same value for each of the identified intersections.

8. The method according to claim 1, wherein setting the radius comprises setting the radius around a node associated with a first identified intersection of the identified intersections to be different from the radius around a node associated with a second identified intersection of the identified intersections.

9. A system comprising:
a non-transitory computer readable medium configured to store instructions thereon; and
a processor connected to the non-transitory computer readable medium, wherein the processor is configured to execute the instructions for:
receiving an image from above a roadway;
generating a skeletonized map based on the received image, wherein the skeletonized map comprises a plurality of roads;
identifying intersections based on joining of multiple roads of the plurality of roads in the skeletonized map;
partitioning the skeletonized map based on the identified intersections, wherein partitioning the skeletonized map defines a roadway data set and an intersection data set;
analyzing the roadway data set to determine a number of lanes in each roadway of the plurality of roads;
analyzing the intersection data set to determine lane connections extending directly across respective intersections in the identified intersections; and
merging results of the analyzed road data set and the analyzed intersection data set to generate a roadway map, wherein the processor is configured to execute the instructions for partitioning the skeletonized map by:
setting a node at each of the identified intersections;
setting a radius around the node; and
defining the roadway data set as being outside of the radius around the node.

10. The system according to claim 9, wherein the received image is a satellite image.

11. The system according to claim 9, wherein the processor is configured to execute the instructions for analyzing the roadway data set using a trained neural network to perform object detection.

12. The system according to claim 11, wherein the processor is configured to execute the instructions for using the object detection to identify lane lines along at least one road of the plurality of roads.

13. The system according to claim 9, wherein the processor is configured to execute the instructions for determining a width of a road of the plurality of roads.

14. The system according to claim 13, wherein the processor is configured to execute the instructions for determining a number of lanes on the road based on the determined width of the road.

15. The system according to claim 9, wherein the processor is configured to execute the instructions for setting the radius around the node to be a same value for each of the identified intersections.

16. The system according to claim 9, wherein the processor is configured to execute the instructions for setting the radius around a node associated with a first identified intersection of the identified intersections to be different from the radius around a node associated with a second identified intersection of the identified intersections.

17. A method of determining a roadway map, the method comprising:
receiving an image from above a roadway;
generating a skeletonized map based on the received image, wherein the skeletonized map comprises a plurality of roads;
identifying nodes based on joining of multiple roads of the plurality of roads in the skeletonized map;
setting a plurality of radii, wherein each of the plurality of radii is around a corresponding node of the identified nodes;
partitioning the skeletonized map to define a roadway data set outside each of the plurality of radii and an intersection data set within each of the plurality of radii;
analyzing the roadway data set to determine a number of lanes in each roadway of the plurality of roads;
analyzing the intersection data set to lane connections; and
merging results of the analyzed road data set and the analyzed intersection data set to generate the roadway map.

18. The method according to claim 17, further comprising wirelessly transmitting the merged results to an external device.

* * * * *